United States Patent
Oshita et al.

(10) Patent No.: US 10,586,983 B2
(45) Date of Patent: *Mar. 10, 2020

(54) POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

(71) Applicant: SUMITOMO METAL MINING CO., LTD., Tokyo (JP)

(72) Inventors: Hiroko Oshita, Niihama (JP); Kazuomi Ryoshi, Niihama (JP); Motoaki Saruwatari, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,726

(22) PCT Filed: Aug. 25, 2016

(86) PCT No.: PCT/JP2016/074843
§ 371 (c)(1),
(2) Date: Feb. 23, 2018

(87) PCT Pub. No.: WO2017/034001
PCT Pub. Date: Mar. 2, 2017

(65) Prior Publication Data
US 2018/0248186 A1 Aug. 30, 2018

(30) Foreign Application Priority Data
Aug. 27, 2015 (JP) .................. 2015-167530

(51) Int. Cl.
*H01M 4/525* (2010.01)
*H01M 4/04* (2006.01)
(Continued)

(52) U.S. Cl.
CPC ............ *H01M 4/525* (2013.01); *C01G 53/42* (2013.01); *C01G 53/50* (2013.01);
(Continued)

(58) Field of Classification Search
CPC ...................................................... C01G 53/44
See application file for complete search history.

(56) References Cited

U.S. PATENT DOCUMENTS

2007/0231691 A1  10/2007 Abe et al.
2010/0167125 A1  7/2010 Miyaki et al.
(Continued)

FOREIGN PATENT DOCUMENTS

JP    5-242891 A    9/1993
JP    8-138669 A    5/1996
(Continued)

OTHER PUBLICATIONS

Iikawa et al., English machine translation of JP 2000-323143 A (Year: 2000).*
(Continued)

*Primary Examiner* — Peter F Godenschwager
(74) *Attorney, Agent, or Firm* — Westerman, Hattori, Daniels & Adrian, LLP

(57) ABSTRACT

Provided is a positive electrode active material for nonaqueous electrolyte secondary batteries that suppresses the gelling of a positive electrode mixture material paste and has high weather resistance, a production method thereof, and the like. A method for producing a positive electrode active material for nonaqueous electrolyte secondary batteries includes cleaning a powder famed of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al with an aqueous solution containing one or
(Continued)

more lithium salts selected from water-soluble lithium salts other than lithium hydroxide and drying the cleaned powder.

7 Claims, 3 Drawing Sheets

(51) Int. Cl.
*H01M 4/58* (2010.01)
*C01G 53/00* (2006.01)
*H01M 10/0525* (2010.01)
*H01M 4/02* (2006.01)

(52) U.S. Cl.
CPC ....... *H01M 4/0497* (2013.01); *H01M 4/5825* (2013.01); *H01M 10/0525* (2013.01); *C01P 2002/52* (2013.01); *C01P 2004/61* (2013.01); *C01P 2006/12* (2013.01); *C01P 2006/40* (2013.01); *H01M 2004/028* (2013.01)

(56) References Cited

U.S. PATENT DOCUMENTS

| | | |
|---|---|---|
| 2013/0071743 A1 | 3/2013 | Miyaki et al. |
| 2016/0043383 A1 | 2/2016 | Hamada et al. |
| 2016/0118656 A1 | 4/2016 | Nakayama et al. |
| 2016/0204415 A1 | 7/2016 | Takanashi et al. |

FOREIGN PATENT DOCUMENTS

| | | |
|---|---|---|
| JP | 2000-323143 A | 11/2000 |
| JP | 2007-273108 A | 10/2007 |
| JP | 2010-64944 A | 3/2010 |
| JP | 2010-157361 A | 7/2010 |
| JP | 2012-174569 A | 9/2012 |
| JP | 2013-157109 A | 8/2013 |
| JP | 2015-046306 A | 3/2015 |
| WO | 2011/071068 A1 | 6/2011 |
| WO | 2014/142314 A1 | 9/2014 |
| WO | 2014/189108 A1 | 11/2014 |

OTHER PUBLICATIONS

International Preliminary Report on Patentability (Form PCT/IB/373) dated Feb. 27, 2018, issued in counterpart International Application No. PCT/JP2016/074843, with Form PCT/ISA/237; with English translation. (13 pages).

International Search Report dated Nov. 29, 2016, issued in counterpart International Application No. PCT/JP2016/074843 (1 page).

Office Action dated Jun. 18, 2019, issued in counterpart JP Application No. 2015-167530, with English translation (9 pages).

\* cited by examiner

POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

TECHNICAL FIELD

The present invention relates to a positive electrode active material for nonaqueous electrolyte secondary batteries, a production method thereof, and a nonaqueous electrolyte secondary battery.

BACKGROUND ART

With the recent wide spread use of portable electronic devices, such as mobile phones and notebook personal computers, there has been a strong demand to develop small, lightweight nonaqueous electrolyte secondary batteries having high energy density. There has been also a demand to develop high-output nonaqueous electrolyte secondary batteries serving as batteries for electric vehicles, including hybrid vehicles. Among nonaqueous electrolyte secondary batteries that satisfy these demands are lithium-ion secondary batteries. A lithium-ion secondary battery includes a negative electrode, a positive electrode, an electrolyte solution, and the like and uses materials capable of releasing and storing lithium as negative and positive electrode active materials.

At present, lithium-ion secondary batteries are actively being researched and developed. Among others, lithium-ion secondary batteries using a multilayer or spinel lithium-metal composite oxide as a positive electrode active material output a 4V-class high voltage and therefore are being commercialized as batteries having high energy density. Among main lithium-metal composite oxides that have been proposed are lithium-cobalt composite oxides (e.g., $LiCoO_2$), which are synthesized relatively easily, lithium-nickel composite oxides (e.g., $LiNiO_2$), which use nickel, which is cheaper than cobalt, lithium-nickel-cobalt-manganese composite oxides (e.g., $LiNi_{1/3}Co_{1/3}Mn_{1/3}O_2$), and lithium-manganese composite oxides (e.g., $LiMn_2O_4$).

To obtain excellent initial capacity characteristics or cycle characteristics, there have been developed many batteries using a lithium-cobalt composite oxide as a positive electrode active material, and various fruits have already been produced. However, a lithium-cobalt composite oxide uses a cobalt compound, which is expensive, as a raw-material. Accordingly, the cost per unit capacity of a battery using a lithium-cobalt composite oxide is much higher than that of a nickel-hydrogen battery and significantly restricts the applicability thereof as a positive electrode active material. For this reason, there is a high expectation that the cost of the positive electrode active material will be reduced with respect to not only small secondary batteries for use in portable devices but also large secondary batteries for power storage purposes or for use in electric vehicles or the like and thus cheaper lithium-ion secondary batteries will be produced. The fulfillment of such an expectation can be said to be industrially significant.

A lithium-nickel composite oxide using nickel, which is cheaper than cobalt, exhibits a lower electrochemical potential than a lithium-cobalt composite oxide. For this reason, lithium-ion secondary batteries using a lithium-nickel composite oxide are expected to have higher capacities. Also, such lithium-ion secondary batteries exhibit high voltages, as with cobalt-based lithium-ion secondary batteries, and therefore are actively being developed. However, if a lithium-ion secondary battery is produced using a lithium-nickel composite oxide synthesized from lithium and only nickel as a positive electrode active material, it disadvantageously exhibits poor cycle characteristics and is more likely to impair battery performance due to the use or storage in a high-temperature environment compared to a cobalt-based lithium-ion secondary battery. As a lithium-nickel composite oxide to overcome these disadvantages, there are commonly known lithium-nickel composite oxides where nickel is partially substituted by cobalt or aluminum, for example, as disclosed in Patent Literature 1.

As a common method to produce a lithium-nickel composite oxide serving as a positive electrode active material, there is known a lithium-nickel composite oxide production method involving preparing a nickel composite hydroxide serving as a precursor by neutralization-crystallization, mixing the precursor and a lithium compound such as lithium hydroxide, and firing the mixture. However, a lithium-nickel composite oxide synthesized using this method still contains unreacted lithium hydroxide. The unreacted lithium hydroxide may gel a positive electrode mixture material paste obtained by kneading the positive electrode active material. Also, if such a positive electrode active material is charged in a high-temperature environment, the reacted lithium hydroxide may be oxidatively decomposed into gas.

In view of the foregoing, Patent Literature 2 proposes a method of removing lithium hydroxide from a synthesized lithium-nickel composite oxide by adding natural water to the lithium-nickel composite oxide and stirring the mixture. Patent Literature 3 proposes a method of removing an unreacted alkali component from a fired lithium-nickel composite oxide by cleaning the lithium-nickel composite oxide with water.

Patent Literature 4 proposes a method involving adding natural water to a synthesized lithium-nickel composite oxide and stirring the mixture to remove lithium hydroxide and then heat-treating the resulting composite oxide in an oxygen atmosphere having an oxygen concentration of 80% by volume at a temperature of 120° C. or more and 550° C. or less. A positive electrode active material obtained using this method compensates for lithium in the surface of the particles thereof lost when water-cleaned, with lithium inside the particles. Thus, the positive electrode active material has no lithium loss in the particle surface thereof, allowing for reductions in the positive electrode resistances of batteries.

CITATION LIST

Patent Literature

[Patent Literature 1] Japanese Unexamined Patent Application Publication No. Hei 05-242891
[Patent Literature 2] Japanese Unexamined Patent Application Publication No. 2007-273108
[Patent Literature 3] Japanese Unexamined Patent Application Publication No. 1996-138669
[Patent Literature 4] International Publication No. 2014/189108

SUMMARY OF THE INVENTION

Technical Problem

However, the water-cleaning methods of Patent Literatures 2 and 3 have the following problem: although lithium hydroxide is removed from the lithium-nickel composite oxide during water-cleaning, lithium is also pulled out of the crystal lattice of the lithium-nickel composite oxide and many lithium compounds are eluted; and therefore, the crystals of the particle surface of the lithium-nickel composite oxide lose lithium ions, resulting in a reduction in the battery capacity and an increase in the battery resistance. The method disclosed in Patent Literature 4 allows lithium to supplementarily migrate from the inside to the surface of the particles of the positive electrode active material, although the amount is very small. However, there is room for improvement in resolving the lithium loss of the entire positive electrode active material.

In view of these problems, an object of the present invention is to provide a positive electrode active material for nonaqueous electrolyte secondary batteries that suppresses the gelling of a positive electrode mixture material paste and allows a secondary battery using the positive electrode active material to have a high capacity and a low positive electrode resistance.

Solution to Problem

To solve the above problems, the present inventors conducted intensive research on lithium-metal composite oxides used as positive electrode active materials for nonaqueous electrolyte secondary batteries and production methods thereof. As a result, the present inventors found that by cleaning a powder famed of a lithium-nickel composite oxide with an aqueous solution containing a lithium salt(s), it is possible to remove unreacted lithium hydroxide or raw material-derived impurities and to prevent pulling of lithium out of the lattice of the lithium-nickel composite oxide, and then completed the present invention.

A first aspect of the present invention provides a method for producing a positive electrode active material for non-aqueous electrolyte secondary batteries. The method includes cleaning a powder formed of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al with an aqueous solution containing one or more lithium salts selected from water-soluble lithium salts other than lithium hydroxide and drying the cleaned powder.

Preferably, a lithium concentration of the aqueous solution is 0.1 g/L or more and 5.0 g/L or less. Preferably, the cleaning includes cleaning the powder in a state in which a slurry concentration of the aqueous lithium salt solution containing the powder is 100 g/L or more and 3000 g/L.

A second aspect of the present invention provides a positive electrode active material for nonaqueous electrolyte secondary batteries. The positive electrode active material includes a powder of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al. A lithium hydroxide content of the positive electrode active material is 0.5% by mass or less, and a composition ratio between Li and metals other than Li in a surface of the powder measured by X-ray photoelectron spectroscopy is 0.80 or more and 1.5 or less, the composition ratio being Li/(Ni+Co+M), the metals being Ni, Co, and M.

Preferably, a powder PH of 5% by mass of a suspension solution obtained by dispersing the powder in water is 11.5 or less.

A third aspect of the present invention provides a non-aqueous electrolyte secondary battery having the positive electrode active material for nonaqueous electrolyte secondary batteries in a positive electrode.

Advantageous Effects of the Invention

According to the positive electrode active material of the present invention, there is obtained a positive electrode active material for nonaqueous electrolyte secondary batteries that suppresses the gelling of a positive electrode mixture material paste and allows a secondary battery using the positive electrode active material to have a high capacity and a low positive electrode resistance. Also, the production method of the present invention allows this positive electrode active material to be easily produced and is suitable particularly to industrial mass production. For this reason, this production method is extremely industrially valuable.

DESCRIPTION OF EMBODIMENTS

Figure 1:
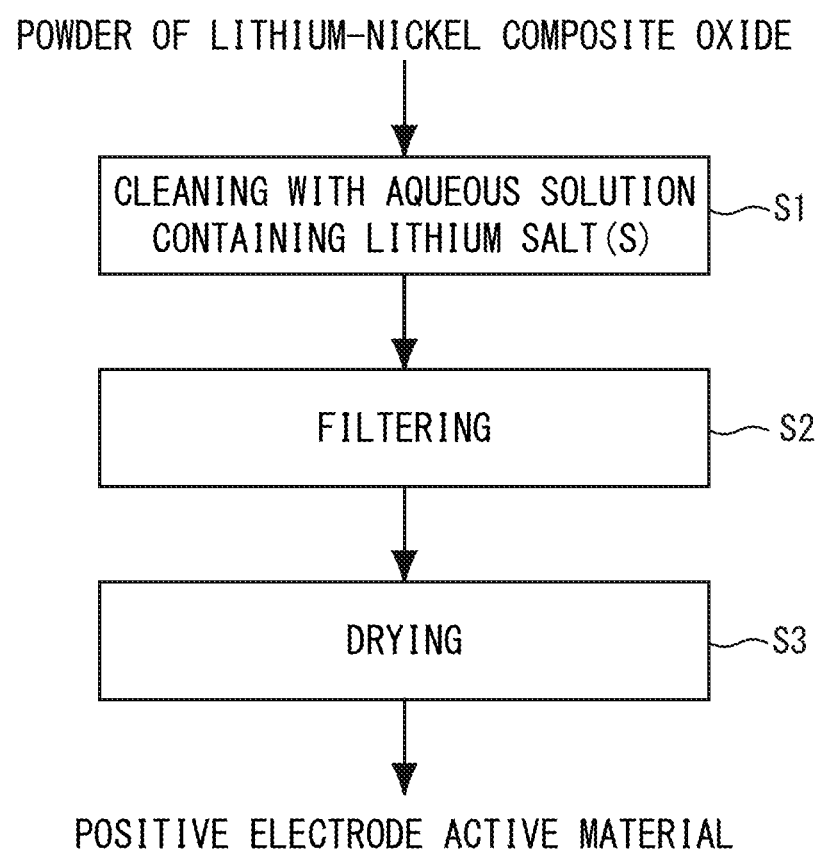
FIG. 1 is a flowchart showing an example of a method for producing a positive electrode active material for nonaqueous electrolyte secondary batteries according to the present embodiment.
Figure 2:
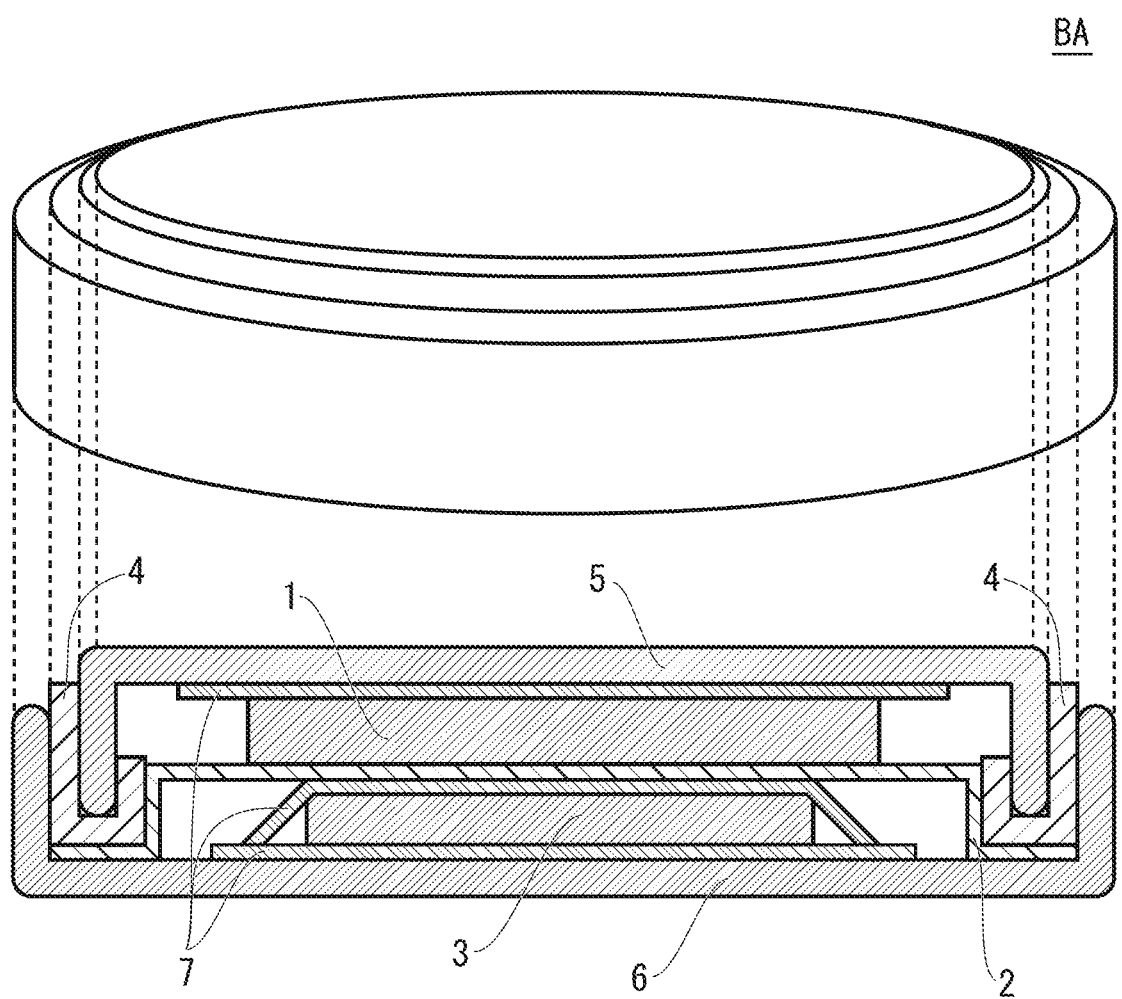
FIG. 2 is a schematic sectional view of a coin battery used to evaluate a battery.

1. Method for Producing Positive Electrode Active Material for Nonaqueous Electrolyte Secondary Batteries Now, one example embodiment of the present invention will be described with reference to the accompanying drawings. FIG. 1 is a flowchart showing a method for producing a positive electrode active material for nonaqueous electrolyte secondary batteries (hereafter also simply referred to as "positive electrode active material") according to the present embodiment. Note that the production method described below is illustrative only and does not limit the production method of the present invention.

As shown in FIG. 1, a powder formed of a lithium-nickel composite oxide is cleaned with an aqueous lithium carbonate solution (step S1). Specifically, first, a powder famed of a lithium-nickel composite oxide (hereafter also simply referred to as "powder") is prepared as a base material. The powder is represented by a general formula $Li_zNi_{1-x-y}Co_xM_yO_2$ where $0 \leq x \leq 0$; $0 \leq y \leq 0$; $0.95 \leq z \leq 10$; and M is at least one element selected from Mn, V, Mg, Mo, Nb, Ti, and Al.

The powder may be produced using any method, including known ones. Examples of a method for producing the powder include a method involving mixing a compound containing lithium and a compound containing a metal other than lithium (a transition metal such as nickel or cobalt, aluminum, etc.) and firing the mixture, a method involving spray-pyrolyzing an aqueous solution containing lithium and a metal other than lithium, and a method involving mixing a hydroxide containing a metal other than lithium obtained by neutralization-crystallization or an oxide obtained by heat-treating the hydroxide, and a lithium compound and firing the mixture. Among these, the method using a hydroxide containing a metal other than lithium obtained by neutralization-crystallization allows the specific surface area or the like of a powder to be obtained to be easily controlled within a desired range. The production method of the present embodiment is suitable for cases in which the raw-materials of the powder are hydroxide and the like and substances derived from the raw-materials remain in the powder.

The powder is cleaned with an aqueous solution containing one or more lithium salts selected from water-soluble lithium salts other than lithium hydroxide (hereafter also referred to as "aqueous lithium salt solution"). This cleaning is performed, for example, by dispersing the powder in the aqueous lithium salt solution and stirring the mixture. By cleaning the powder with the lithium salt-containing aqueous solution, impurities such as lithium hydroxide in the powder surface are removed, and pulling of lithium out of the crystal lattice of the powder surface is suppressed. Thus, there is obtained a positive electrode active material that suppresses the gelling of a positive electrode mixture material paste, reduces the positive electrode resistances of batteries, and has a high capacity and excellent output characteristics.

The aqueous solution used for cleaning contains, as solutes, one or more lithium salts selected from water-soluble lithium salts other than lithium hydroxide. The water-soluble lithium salts other than lithium hydroxide may be any lithium salts, including known ones. Examples thereof include lithium carbonate, lithium hydrogencarbonate, lithium citrate, lithium acetate, lithium oxalate, lithium tartrate, lithium sulfate, lithium nitrate, lithium chloride, lithium bromide, and lithium iodide. Use of lithium nitrate and lithium sulfate as water-soluble lithium salts allows for a further reduction in the positive electrode resistance (hereafter also referred to as "reaction resistance"). To reduce the amount of remaining sulfate group, it is preferred to use water-soluble lithium salts other than sulfate. A single lithium salt may be used, or two or more lithium salts may be used in combination. Note that the aqueous solution may contain a solute other than the water-soluble lithium salts to the extent that the effects of the present invention are not impaired.

If the powder is cleaned with an aqueous solution containing lithium hydroxide, the lithium hydroxide remaining in the positive electrode active material may gel a positive electrode mixture material paste. Also, if such a positive electrode active material is charged in a high-temperature environment, the remaining lithium hydroxide may be oxidatively decomposed into gas.

The aqueous lithium salt solution may have any lithium concentration as long as the lithium compounds are soluble in water. The lithium concentration is, for example, 0.1 g/L or more and 5.0 g/L or less. If the lithium concentration is less than 0.1 g/L, an expected effect of preventing pulling of lithium out of the crystal lattice of the powder surface may not be obtained. Also, if the lithium concentration is more than 5.0 g/L, excess lithium compounds may remain in the positive electrode active material, resulting in a reduction in the battery performance.

The lithium concentration of the aqueous lithium salt solution is preferably 0.3 g/L or more and 5.0 g/L or less, more preferably 0.5 g/L or more and 3.0 g/L or less, even more preferably 1.0 g/L or more and 2.5 g/L or less. If the lithium concentration falls within the above range, the lithium content or the like of the positive electrode active material is easily adjustable to a desired range with higher efficiency.

The aqueous lithium salt solution containing the powder may have any slurry concentration as long as the powder is uniformly dispersed in the aqueous lithium salt solution. The slurry concentration is, for example, 100 g/L or more and 3000 g/L or less. The unit of the slurry concentration, g/L, means the amount (g) of powder with respect to the amount (L) of aqueous lithium carbonate solution in the slurry. If the slurry concentration falls within the above range, the amount of powder contained in the slurry is increased as the slurry concentration is increased, allowing for the treatment of a larger amount of powder. On the other hand, if the slurry concentration is less than 100 g/L, an expected effect of preventing pulling of lithium out of the crystal lattice of the powder surface may not be obtained. Also, if the slurry concentration is more than 3000 g/L, the slurry viscosity may be significantly increased, making it difficult to stir the solution, or lithium hydroxide may not be sufficiently removed.

The slurry concentration of the aqueous lithium salt solution containing the powder is preferably 100 g/L or more and 2500 g/L or less, more preferably 200 g/L or more and 2000 g/L or less, even more preferably 400 g/L or more and 2000 g/L or less. If the slurry concentration falls within the above range, the slurry viscosity will fall within an appropriate range, and lithium hydroxide or the like is able to be removed more efficiently.

Any other cleaning condition may be set in addition to those described above, and an adjustment may be made as appropriate so that lithium hydroxide or sulfate group remaining in the powder is sufficiently removed and the lithium carbonate content falls within a desired range. For example, the time during which the aqueous lithium carbonate solution containing the powder is stirred may be about 5 min to 1 h. The cleaning temperature may be about 10° C. to 30° C.

During cleaning, lithium in the powder may is eluted into the slurry. For this reason, the atomic ratio of Li in the powder may vary between before and after cleaning. Li is one of main elements whose atomic ratios may vary due to cleaning, and the atomic ratios of the metals other than Li before cleaning are maintained even after cleaning. The atomic ratio of Li reduced due to the above cleaning is, for example, about 0.03 to 0.08. The atomic ratio value of Li reduced when cleaning the powder with the aqueous lithium salt solution tends to be smaller than that when cleaning the powder with normal water, that is, the reduction in Li tends to be smaller. The atomic ratio of Li after cleaning is controllable by previously checking the amount of reduction in the atomic ratio of Li between before and after cleaning by performing a preliminary test on the same cleaning conditions and then using a lithium-metal composite oxide powder where the atomic ratio of Li serving as a base material has been adjusted.

After cleaning the powder with the aqueous lithium carbonate solution, the slurry containing the powder is filtered, as shown in FIG. 1 (step S2). The slurry may be filtered using any method, including known ones. For example, a commonly used filter such as a suction filter, filter press, or centrifuge may be used. By filtering the powder, it is possible to reduce the amount of water that adheres to the powder surface when solid-liquid separating the slurry. If a large amount of water adheres, the lithium salt(s) dissolved in the solution may be reprecipitated, and the amount of lithium in the surface of the dried lithium-nickel composite oxide particles may fall outside an expected range. Note that step S2 is performed optionally. If step 2S is not performed, the adhering water may be removed, for example, by leaving the slurry to stand or centrifuging it to remove supernatant substances.

Then, the filtered powder is dried, as shown in FIG. 1 (step S3). The powder may be dried at any temperature as long as moisture contained in the powder is sufficiently removed. Preferably, the drying temperature is, for example, 80° C. or more and 350° C. or less. If the drying temperature is below 80° C., the drying of the cleaned powder is slowed. Thus, the lithium concentration may be inclined between the surface and inside of the powder, producing a positive electrode active material having low battery characteristics. Also, if the drying temperature is above 350° C., the crystal structure around the powder surface may collapse, producing a positive electrode active material having low battery characteristics. The reason seems that the crystal structure around the surface of the cleaned powder is extremely close to a stoichiometric ratio, or close to a charged state due to the release of a slight amount of lithium and thus is more likely to collapse.

The powder may be dried for any duration of time, but is preferably dried for a duration of time such that the moisture content of the dried powder is 0.2% by weight or less, preferably 0.1% by weight or less, more preferably 0.05% by weight or less. The drying time is, for example, 1 h or more and 24 h or less. The moisture content of the powder is able to be measured at a vaporization temperature of 300° C. using a Karl Fischer moisture meter.

The powder is preferably dried in a gas atmosphere that does not contain a compound component containing carbon and sulfur, or in a vacuum atmosphere. The amounts of carbon and sulfur in the powder are easily controllable by cleaning (step S1). If the powder is dried in an atmosphere that contains a compound component containing carbon and sulfur or in a vacuum atmosphere in step S3, the amounts of carbon and sulfur in the powder may vary and an expected effect may not be obtained.

2. Positive Electrode Active Material for Nonaqueous Electrolyte Secondary Batteries A positive electrode active material for nonaqueous electrolyte secondary batteries according to the present embodiment is formed of a powder of a lithium-nickel composite oxide represented by a general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al. The lithium hydroxide content thereof is 0.5% by mass or less, and the composition ratio of Li to metals (Ni, Co, and M) other than Li [Li/(Ni+Co+M)] in the powder surface measured by X-ray photoelectron spectroscopy is 0.80 or more and 1.5 or less. The positive electrode active material of the present embodiment will be described below.

Composition of Entire Powder

The positive electrode active material for nonaqueous electrolyte secondary batteries is formed of a lithium-nickel composite oxide represented by the general formula $Li_zNi_{1-x-y}Co_xM_yO_2$ where $0 \leq x \leq 0.35$; $0 \leq y \leq 0.10$; $0.95 \leq z \leq 1.10$; and M is at least one element selected from Mn, V, Mg, Mo, Nb, Ti, and Al.

In the general formula, z represents the atomic ratio of Li to metals (Ni, Co, and M) other than Li in the lithium-nickel composite oxide when the atomic ratio of the metals is 1. The range of z is $0.95 \leq z \leq 1.10$. If z falls within the above range, the charge/discharge capacity is increased as the value of z is increased. On the other hand, if z is less than 0.95, the reaction resistance of the positive electrode may be increased, reducing the battery output. Also, if z is more than 1.10, a secondary battery having lower safety may be produced. In terms of the balance between the battery output and the safety, the range of z is preferably $0.97 \leq z \leq 1.05$, more preferably $0.97 \leq z \leq 1.00$. As described above, when the powder famed of the lithium-nickel composite oxide is cleaned as a base material, Li may be eluted from the powder. For this reason, the amount of Li reduced by cleaning is checked through a preliminary test, and a yet-to-be-cleaned powder is prepared such that the element ratio of Li after cleaning falls within the above range. This allows the atomic ratio of L to fall within the above range.

In the general formula, x represents the element ratio of Co to metals (Ni, Co, and M) other than Li when the atomic ratio of the metals is 1. The range of x is $0 \leq x \leq 0.35$, preferably $0 \leq x \leq 0.35$. The inclusion of cobalt in the positive electrode active material allows good cycle characteristics to be obtained. The reason is that the substitution of a part of the crystal lattice of nickel by cobalt allows for a reduction in the expansion/contraction behavior of the crystal lattice caused by the release or storage of lithium associated with a charge or discharge.

In order to improve the cycle characteristics of secondary batteries, the range of x is preferably $0.03 \leq x \leq 0.35$, more preferably $0.05 \leq x \leq 0.35$. Also, in terms of the capacities of secondary batteries, the range of x is preferably $0.03 \leq x \leq 0.15$, more preferably $0.05 \leq x \leq 0.15$. Also, in terms of thermal stability, the range of x is preferably $0.07 \leq x \leq 0.25$, more preferably $0.10 \leq x \leq 0.20$.

In the general formula, y represents the element ratio of M (additional element) to metals (Ni, Co, and M) other than Li when the atomic ratio of the metals is 1. M is at least one element selected from Mn, V, Mg, Mo, Nb, Ti, and Al. The range of y is $0 \leq y \leq 0.10$, preferably $0 \leq y \leq 0.10$ meaning that M is necessarily contained, more preferably $0 \leq y \leq 0.05$ meaning that M is necessarily contained. The addition of M to a positive electrode active material allows a secondary battery containing the resulting positive electrode active material to have higher durability or safety. Note that if y is more than 0.10, the atomic ratios of metal elements conducive to oxidation-reduction reaction (Redox reaction) may be reduced, resulting in a reduction in the battery capacity. If M is aluminum, the positive electrode active material will have higher safety.

In the general formula, the element ratio of nickel to metals (Ni, Co, and M) other than Li is 0.55 or more and 1 or less when the atomic ratio of the metals is 1. By adjusting the mixing ratio among the raw-materials including Li, Ni, Co, and M, the atomic ratios of the metals in the lithium-nickel composite oxide are allowed to fall within the above ranges.

Lithium Hydroxide Content

The positive electrode active material of the present embodiment has a lithium hydroxide content of 0.5% by mass or less, preferably 0.2% by mass or less. If the lithium hydroxide content of the positive electrode active material is more than 0.5% by mass, a paste by kneading the positive electrode active material may be gelled. Also, if such a positive electrode active material is charged in a high-temperature environment, lithium hydroxide may be oxidatively decomposed into gas. The lower limit of the lithium hydroxide content of the positive electrode active material may be any percentage and is, for example, 0.01% by mass or more.

Lithium hydroxide contained in the positive electrode active material includes lithium hydroxide derived from the raw-materials used when producing the positive electrode active material. For example, the lithium hydroxide includes unreacted substances left after obtaining a lithium-nickel composite oxide by mixing a nickel composite hydroxide, nickel composite oxide, or the like and a lithium compound such as lithium hydroxide and then firing the mixture. The lithium hydroxide content is a value obtained by adding pure water to the obtained positive electrode active material, stirring the mixture, then measuring the amount of lithium (Li) eluted into the pure water, by neutralization titration using 1 mol/liter of hydrochloric acid, then subtracting the amount of lithium (Li) derived from a lithium salt(s) used for cleaning from the amount of the eluted lithium (Li), defining the obtained value as the amount of lithium hydroxide-derived lithium (Li), and converting this amount into LiOH. As used herein, the amount of lithium (Li) derived from the lithium salt(s) is obtained by obtaining the amount of one or more metals other than Li contained in the lithium salt(s) by chemical analysis and converting the obtained amount into the amount of lithium salt(s).

Li/(Ni+Co+M) in Powder Surface

In the case of the positive electrode active material of the present embodiment, the composition ratio between Li and the metals (Ni, Co, and M) other than Li [Li/(Ni+Co+M)] in the powder surface measured by X-ray photoelectron spectroscopy is 0.80 or more and 1.5 or less, preferably 0.80 or more and 1.45 or less, more preferably 0.93 or more and 1.45 or less, even more preferably 0.95 or more and 1.45 or less, particularly preferably 1.00 or more and 1.45 or less. If Li/(Ni+Co+M) in the powder surface is less than 0.80, lithium ions in the particle surface are lost. Thus, if such a positive electrode active material is used in the positive electrode of a secondary battery, the conduction path of lithium ions may be blocked, resulting in a reduction in the discharge capacity or an increase in the reaction resistance. Note that a reduction in the reaction resistance reduces the voltage lost in the battery and relatively increases the voltage actually applied to the load side, producing high output. Also, if Li/(Ni+Co+M) in the powder surface is more than 1.5, lithium compounds such as lithium hydroxide may be formed in the powder surface in an excessive amount, resulting in the gelling of a positive electrode mixture material paste. If the positive electrode active material having such excess lithium compounds formed in the surface thereof is charged in a high-temperature environment, the lithium compounds may be decomposed into gas, resulting in a reduction in the battery characteristics. Also, lithium compounds that do not contribute to charge/discharge may be formed in the surface of the positive electrode active material. If a battery is produced using such a positive electrode active material, an unnecessary negative electrode material in an amount equivalent to the irreversible capacity of the positive electrode active material is used in the battery. Thus, the capacity per unit weight and per unit volume of the entire battery may be reduced, and unnecessary lithium accumulated in the negative electrode as an irreversible capacity may cause a safety problem.

As will be described in Examples in detail later, the composition ratio between Li and the metals other than Li [Li/(Ni+Co+M)] in the powder surface is measurable by X-ray photoelectron spectroscopy. As used herein, the powder surface means a region with a depth of about several nm to 10 nm from the surface toward the center of the positive electrode active material measured by an X-ray photoelectron spectrometer (XPS) (Versa Probell available from ULVAC-PHI, INCORPORATED.).

Powder pH

The powder pH of 5% by mass of a suspension solution obtained by dispersing the powder of the positive electrode active material of the present embodiment in water is 11.5 or less. If the pH is more than 11.5, a positive electrode mixture material paste obtained by kneading the positive electrode active material may be gelled. The lower limit of the powder pH may be any value, but is, for example, preferably 10.5 or more, more preferably 11.0 or more.

Average Particle Diameter

The positive electrode active material of the present embodiment may have any average particle diameter. However, if the average particle diameter is, for example, 3 μm or more and 25 μm or less, it is possible to increase the battery capacity per unit volume of the positive electrode active material and to obtain a secondary battery having high safety and good cycle characteristics. As used herein, the average particle diameter means the value of a volume average particle diameter MV obtained from a volume-integrated value measured using a laser diffraction particle size analyzer.

Specific Surface Area

The positive electrode active material of the present embodiment may have any specific surface area. However, if the specific surface area is, for example, 1.0 $m^2/g$ or more and 7.0 $m^2/g$ or less, a particle surface having a sufficient area is able to contact an electrolyte solution. On the other hand, if the specific surface area is less than 1.0 $m^2/g$, the area of a particle surface capable of contacting the electrolyte solution may be reduced, failing to obtain a sufficient charge/discharge capacity. Also, if the specific surface area is above 7.0 $m^2/g$, the area of a particle surface capable of contacting the electrolyte solution may be excessively increased, resulting in a reduction in safety. As used herein, the specific surface area means a value measured by a specific surface area measurement instrument using the BET method, which uses nitrogen gas adsorption.

The positive electrode active material of the present embodiment is able to be easily mass produced in an industrial scale by using the positive electrode active material production method described above.

3. Nonaqueous Electrolyte Secondary Battery

A nonaqueous electrolyte secondary battery of the present embodiment has the above positive electrode active material in a positive electrode. As with a typical nonaqueous electrolyte secondary battery, the nonaqueous electrolyte secondary battery of the present embodiment includes a positive electrode, a negative electrode, a separator, and a nonaqueous electrolyte solution. The elements, shape, and configuration of the nonaqueous electrolyte secondary battery of the present embodiment will be described below in detail.

Positive Electrode

A positive electrode mixture material of which the positive electrode is formed and materials included in the mixture material will be described. A positive electrode mixture material paste is prepared by mixing a powdery positive electrode active material of the present invention, a conductive material, and a binder, optionally adding activated carbon or a solvent for viscosity adjustment or other purposes, and kneading the mixture. The mixing ratio among the materials included in the positive electrode mixture material is an important factor that determines the performance of a lithium secondary battery.

The mixing ratio among the materials included in the positive electrode mixture material may be any ratio. However, as with those of the positive electrode of a typical lithium secondary battery, the contents of the materials with respect to the total mass of the solid content of 100% of the positive electrode mixture material except for the solvent are preferably as follows: the content of the positive electrode active material is 60% by mass or more and 95% by mass or less; the content of the conductive material is 1% by mass or more and 20% by mass or less; and the content of the binder is 1% by mass or more and 20% by mass or less.

The prepared positive electrode mixture material paste is applied to, for example, a surface of a collector famed of an aluminum foil and dried to scatter (vaporize) the solvent. Optionally, the applied positive electrode mixture material paste may be pressed using a roll press or the like to increase the electrode density. In this way, a sheet-shaped positive electrode is able to be produced. The sheet-shaped positive electrode is able to be used to produce the target battery, for example, by cutting it into a size suitable for the battery. Note that the positive electrode need not be produced using the method described above and may be produced using any other method.

Examples of the conductive material used to produce the positive electrode include carbon black-based materials, such as graphite (natural graphite, artificial graphite, expanded graphite, etc.), acetylene black, and Ketjen black.

The binder has the function of binding the particles of the active material together. Examples of the binder include fluorine-containing resins such as polyvinylidene fluoride, polytetrafluoroethylene, ethylene propylene diene rubber, and fluororubber and thermoplastic resins such as styrene butadiene, cellulose-based resin, polyacrylic acid, polypropylene, and polyethylene.

Optionally, a solvent to disperse the positive electrode active material, the conductive material, and the activated carbon and to dissolve the binder may be added to the positive electrode mixture material. The additional solvent may be, for example, an organic solvent such as N-methyl-2-pyrrolidone. Also, activated carbon may be added to the positive electrode mixture material to increase the electric double layer capacity.

Negative Electrode

The negative electrode is famed by mixing a binder with metallic lithium, lithium alloy, or the like or a negative electrode active material capable of storing and releasing lithium ions and adding an appropriate solvent to the mixture to prepare a pasty negative electrode mixture material, applying the pasty negative electrode mixture material to a surface of a metal-foil collector famed of copper or the like, drying it, and optionally compressing the dried mixture material to increase the electrode density.

Examples of the negative electrode active material include natural graphite, artificial graphite, a fired body of an organic compound such as phenol resin, and a powder of a carbon material such as coke. As in the positive electrode, the negative electrode binder may be a fluorine-containing resin, such as polyvinylidene fluoride. The solvent to disperse the active material and the binder may be an organic solvent such as N-methyl-2-pyrrolidone.

Separator

The separator is disposed so as to be sandwiched between the positive electrode and the negative electrode. The separator separates the positive electrode and the negative electrode from each other and holds an electrolyte. It may be a thin, porous film formed of polyethylene, polypropylene, or the like.

Nonaqueous Electrolyte Solution

The nonaqueous electrolyte solution is prepared by dissolving a lithium salt serving as a supporting electrolyte in an organic solvent. The organic solvent may be one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the supporting electrolyte include $LiPF_6$, $LiBF_4$, $LiClO_4$, $LiAsF_6$, $LiN(CF_3SO_2)_2$, and composite salts thereof. The nonaqueous electrolyte solution may contain a radical scavenger, a surfactant, a flame retardant, or the like.

Shape and Configuration of Battery

The lithium secondary battery according to the present embodiment may have any shape, including a cylindrical shape and a multilayer shape. No matter what shape the lithium secondary battery has, the positive electrode and the negative electrode are stacked with the separator therebetween to form an electrode body, and the electrode body is impregnated with the nonaqueous electrolyte solution. Collection leads or the like are used to connect a positive electrode collector and a positive electrode terminal leading to the outside and to connect a negative electrode collector and a negative electrode terminal leading to the outside. The lithium secondary battery thus configured is hermetically sealed in a battery case, thereby completing the battery.

EXAMPLES

The present invention will be described below using Examples and Comparative Examples, but is not limited to Examples. Examples and Comparative Examples were evaluated on the basis of the results of measurements performed using apparatuses and methods below.

Composition of Entire Particles

In each of Examples and Comparative Examples, a powder of a lithium-nickel composite oxide used as a base material was dissolved in nitric acid and then the composition ratio among the components was measured using an ICP emission spectrophotometer (ICPS-8100 available from SHIMADZU CORPORATION). The obtained positive electrode active material was measured as described above.

Composition of Particle Surface

The obtained positive electrode active material was measured using an X-ray photoelectron spectrometer (Versa ProbeII available from ULVAC-PHI, INCORPORATED.). A monochromatized Al-Kα ray (1486.7 eV) was used as an X-ray source. The tilt angle was set to 45°, the path energy was set to 187.85 eV, and the degree of vacuum was set to $10^{-7}$ Pa.

Lithium Hydroxide Content

To 10 g of the positive electrode active material powder obtained in each of Examples and Comparative Examples was added 100 ml of extra-pure water and stirred for 5 min and filtered. Then, the filtrate was titrated with 1 mol/liter of hydrochloric acid and measured until the second neutralization point is reached. The amount of alkali component neutralized with the hydrochloric acid was defined as the total amount of lithium (Li) derived from lithium hydroxide (LiOH) and a lithium salt(s) used for cleaning. Then, as shown in Formula below, the amount of Li derived from the lithium salt(s) used for cleaning was subtracted from the amount of alkali component neutralized by neutralization titration, and the obtained amount was defined as the amount of lithium hydroxide (LiOH)-derived Li. The amount of lithium (Li) derived from the lithium salt(s) used for cleaning was calculated from lithium salt contents obtained using a method below.

Amount of lithium hydroxide-derived Li=Amount of alkali component neutralized with hydrochloric acid−Amount of Li derived from lithium salt(s) used for cleaning    Formula The amount of lithium hydroxide (LiOH)-derived Li calculated using the above formula was converted into the amount of LiOH, and the obtained amount was defined as the lithium hydroxide content.

Lithium Carbonate, Lithium Citrate, and/or Lithium Acetate

The contents of these lithium salts were obtained by measuring the total carbon (TC) content using a carbon-sulfur analyzer (CS-600 available from LECO JAPAN CORPORATION) and converting the measured total carbon content into respective lithium salts.

Lithium Sulfate

The lithium sulfate content was determined by measuring the sulfur (S) content by ICP emission spectrometry and converting the measured sulfur (S) content into lithium sulfate.

Lithium Nitrate

The lithium nitrate content was obtained by stirring the positive electrode active material in ultra-pure water to elute lithium nitrate, then filtering the resulting positive electrode active material, measuring the nitric group content of the filtrate by ion chromatography, and converting the measured nitric group content into lithium nitric group.

Powder pH

Five point zero g of the positive electrode active material obtained in each of Examples and Comparative Examples was dispersed in 100 ml of distilled water to prepare 5% by mass of suspension. The prepared suspension was stirred at a room temperature of 25° C. for 30 min, and the pH value of the resulting suspension was measured.

Determination of Gelling of Paste

A paste was prepared by putting 20 g of the positive electrode active material obtained in each of Examples and Comparative Examples in a container along with 2.2 g of PVDF (model number KF polymer #1100 available from KUREHA CORPORATION) and 9.6 ml of NMP (available from Kanto Chemical Co., Inc.) and sufficiently mixing these materials using a kneader (product name Non-Bubbling Kneader, model number NBK-1 available from NISSEI Corporation) at a rotation speed of 2000 rpm for 10 min. The prepared paste was transferred to a glass bottle. The glass bottle was sealed tightly and then stored in a dry box at a temperature of 25° C. and a dew point of −40° C. The paste was left to stand for 24 h and then observed for fluidity. Of the pastes of Examples and Comparative Examples left to stand for 24 h, those whose fluidity did not change were evaluated as A; those whose fluidity remained but changed as B; and those that gelled as C.

Evaluation of Battery Characteristics (1) Production of Evaluation Coin Battery

Into 70% by mass of the positive electrode active material obtained in each of Examples and Comparative Examples were mixed 20% by mass of acetylene black and 10% by mass of PTFE. One hundred fifty mg of the mixture was extracted and formed into a pellet serving as a positive electrode. Used as a negative electrode was lithium metal. Used as an electrolyte solution was an equal amount mixed solution of ethylene carbonate (EC) and diethyl carbonate (DEC) using 1M of $LiClO_4$ as a supporting electrolyte (available from TOMIYAMA PURE CHEMICAL INDUSTRIES, Ltd.). A 2032-type coin battery as shown in FIG. 1 was produced in an Ar-atmosphere glove box in which the dew point was controlled to −80° C. The 2032-type evaluation coin battery BA included a lithium metal negative electrode 1 serving as a negative electrode, a separator 2 that was impregnated with an electrolyte solution, a positive electrode 3, a gasket 4, a negative electrode can 5, a positive electrode can 6, and a current collector 7.

(2) Discharge Capacity

The produced coin battery BA was left to stand for 24 h. After the open circuit voltage (OCV) was stabilized, the coin battery was charged to a cutoff voltage of 4.3 V with the current density at the positive electrode being 0.5 mA/cm². The then capacity was measured as a charge capacity. After a rest of 1 h, the coin battery was discharged to a cutoff voltage of 3.0 V. The then capacity was measured as a discharge capacity and evaluated.

(3) Positive Electrode Resistance

Figure 3:
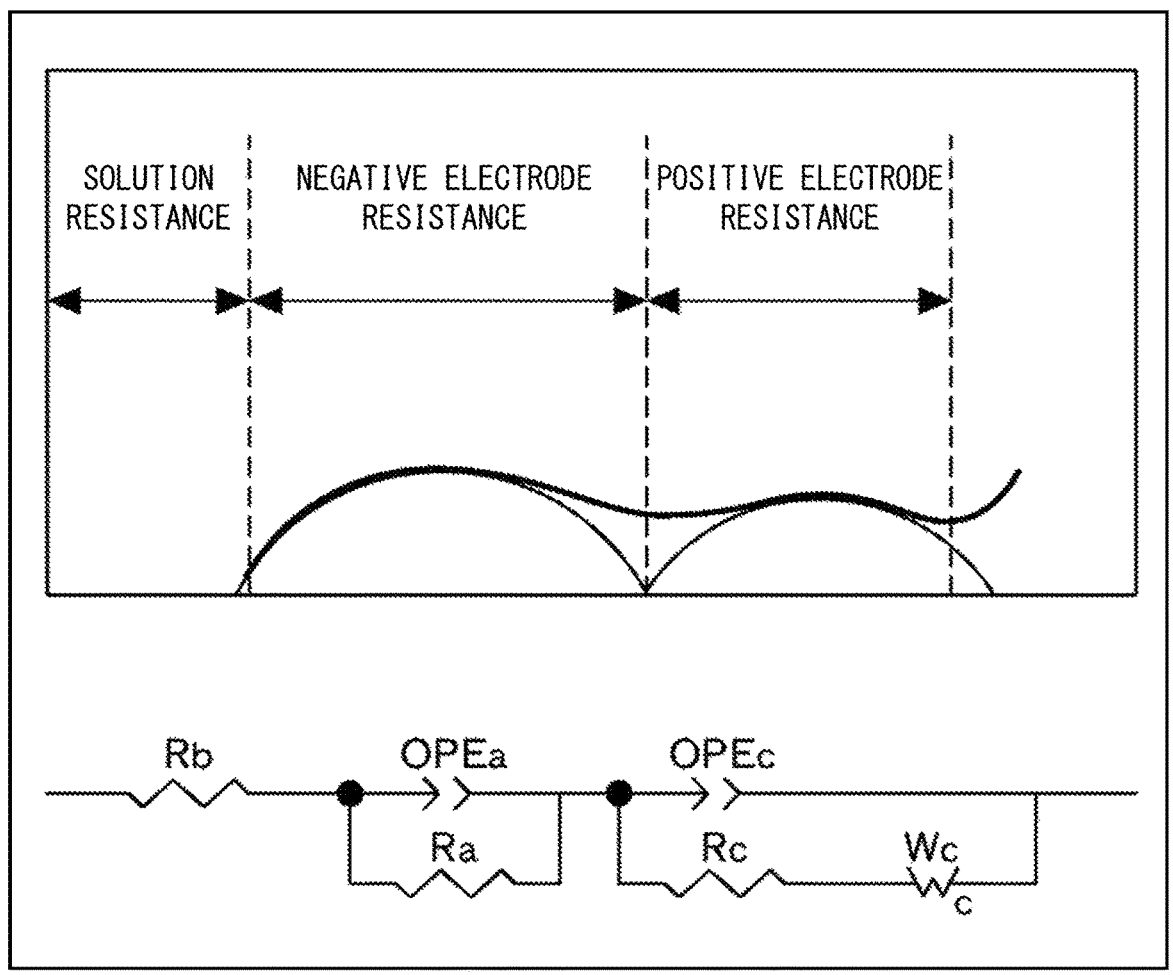
FIG. 3 includes a diagram showing a Nyquist plot (upper diagram) based on an impedance measurement method and a diagram showing an equivalent circuit (lower diagram).

The produced coin battery BA was charged at a charge potential of 4.1 V, and the positive electrode resistance was measured using a frequency response analyzer and a potentio-galvanostat (1255B available from Solartron Analytical) and using the AC impedance method. An upper diagram of FIG. 3 shows an obtained Nyquist plot. This Nyquist plot represents the sum of characteristic curves showing the solution resistance, the negative electrode resistance and the capacity thereof, and the positive electrode resistance and the capacity thereof. A fitting calculation was performed using an equivalent circuit shown in a lower diagram of FIG. 3 on the basis of this Nyquist plot to calculate the positive electrode resistance value. The evaluation value of each positive electrode resistance was calculated as a relative value when that of Example 1 is 100.

Example 1

Using a known technology involving mixing an oxide powder containing nickel as a main component and lithium hydroxide and firing the mixture, a fired powder of a lithium-nickel composite oxide represented by $Li_{1.03}Ni_{0.88}Co_{0.09}Al_{0.03}O_2$ was prepared as a base material. This powder had an average particle diameter of 12.0 μm and a specific surface area of 1.2 m²/g. The average particle diameter was measured using a laser diffraction particle size analyzer (Microtrac available from Nikkiso Co., Ltd.), and the specific surface area was evaluated using a specific surface area measurement instrument (Quantasorb QS-10 available from Yuasa Ionics Co.) and using the BET method, which uses nitrogen gas adsorption.

To the lithium-nickel composite oxide powder (base material) was added an aqueous lithium carbonate solution prepared so that the amount of lithium becomes 1.5 g/L, to prepare a slurry having a concentration of 750 g/L. The slurry was cleaned by stirring for 30 min. Then, the cleaned slurry was filtered, and the extracted powder was dried by maintaining it in a vacuum atmosphere at a temperature of 210° C. for 14 h, to obtain a positive electrode active material formed of the lithium-nickel composite oxide. The atomic ratio z of Li of the obtained positive electrode active material was measured as 0.992 using an ICP emission spectrophotometer.

Example 2

In Example 2, a positive electrode active material was obtained as in Example 1 except that an aqueous lithium carbonate solution was prepared such that the lithium concentration thereof becomes 0.3 g/L, and then evaluated.

Example 3

In Example 3, a positive electrode active material was obtained as in Example 1 except that an aqueous lithium carbonate solution was prepared such that the lithium concentration thereof becomes 0.7 g/L, and then evaluated.

Example 4

In Example 4, a positive electrode active material was obtained as in Example 1 except that an aqueous lithium carbonate solution was prepared such that the lithium concentration thereof becomes 1.0 g/L, and then evaluated.

Example 5

In Example 5, a positive electrode active material was obtained as in Example 1 except that an aqueous lithium carbonate solution was prepared such that the lithium concentration thereof becomes 2.5 g/L, and then evaluated.

Example 6

In Example 6, a positive electrode active material was obtained as in Example 1 except that an aqueous lithium carbonate solution was prepared such that the lithium concentration thereof becomes 3.0 g/L, and then evaluated.

Example 7

In Example 7, a positive electrode active material was obtained as in Example 1 except that the slurry concentration was set to 100 g/L, and then evaluated.

Example 8

In Example 8, a positive electrode active material was obtained as in Example 1 except that the slurry concentration was set to 375 g/L, and then evaluated.

Example 9

In Example 9, a positive electrode active material was obtained as in Example 1 except that the slurry concentration was set to 1500 g/L, and then evaluated.

Example 10

In Example 10, a positive electrode active material was obtained as in Example 1 except that the slurry concentration was set to 3000 g/L, and then evaluated.

Example 11

In Example 11, a positive electrode active material was obtained as in Example 1 except that an aqueous lithium citrate solution was used in place of an aqueous lithium carbonate solution, and then evaluated.

Example 12

In Example 12, a positive electrode active material was obtained as in Example 1 except that an aqueous lithium acetate solution was used in place of an aqueous lithium carbonate solution, and then evaluated.

Example 13

In Example 13, a positive electrode active material was obtained as in Example 1 except that an aqueous lithium nitrate solution was used in place of an aqueous lithium carbonate solution, and then evaluated.

Example 14

In Example 14, a positive electrode active material was obtained as in Example 1 except that an aqueous lithium sulfate solution was used in place of an aqueous lithium carbonate solution, and then evaluated.

Comparative Example 1

In Comparative Example 1, a positive electrode active material was obtained as in Example 1 except that a cleaning step using an aqueous lithium carbonate solution was not performed, and then evaluated.

Comparative Example 2

In Comparative Example 2, a positive electrode active material was obtained as in Example 1 except that pure water was used in place of an aqueous lithium carbonate solution, and then evaluated.

Comparative Example 3

In Comparative Example 3, a positive electrode active material was obtained as in Example 1 except that pure water was used in place of an aqueous lithium carbonate solution and the slurry concentration was set to 375 g/L, and then evaluated.

Comparative Example 4

In Comparative Example 4, a positive electrode active material was obtained as in Example 1 except that pure water was used in place of an aqueous lithium carbonate solution and the slurry concentration was set to 3000 g/L, and then evaluated.

Comparative Example 5

In Comparative Example 5, a positive electrode active material was obtained as in Example 1 except that an aqueous lithium hydroxide solution was used in place of an aqueous lithium carbonate solution, and then evaluated.

TABLE 1

| | LizNi$_{1-x-y}$Co$_x$M$_y$O$_z$ | | | | Cleaning conditions | | | Atomic ratio of water-cleaned | Li/metals other than Li in powder surface | | | | | Positive electrode resistance Rct. |
| | | | | | Aqueous lithium salt solution | | | | | | | | | |
| | Li z | Ni 1-x-y | Co x | M y | Solute | Li concentration g/L | Slurry-concen tration g/L | Li z | | LiOH content Mass % | powder pH | Gelling determination | Discharge capacity mAh/g | Relative value |
|---|---|---|---|---|---|---|---|---|---|---|---|---|---|---|
| Example 1 | 1.03 | 0.88 | 0.09 | 0.03 | Lithium carbonate | 1.5 | 750 | 0.992 | 1.25 | 0.10 | 11.3 | ◎ | 212 | 100 |
| Example 2 | 1.03 | 0.88 | 0.09 | 0.03 | Lithium carbonate | 0.3 | 750 | 0.984 | 0.93 | 0.10 | 11.3 | ◎ | 207 | 108 |
| Example 3 | 1.03 | 0.88 | 0.09 | 0.03 | Lithium carbonate | 0.7 | 750 | 0.986 | 1.08 | 0.11 | 11.4 | ◎ | 209 | 106 |
| Example 4 | 1.03 | 0.88 | 0.09 | 0.03 | Lithium carbonate | 1.0 | 750 | 0.988 | 1.17 | 0.10 | 11.3 | ◎ | 211 | 97 |
| Example 5 | 1.03 | 0.88 | 0.09 | 0.03 | Lithium carbonate | 2.5 | 750 | 0.996 | 1.36 | 0.12 | 11.2 | ◎ | 212 | 102 |
| Example 6 | 1.03 | 0.88 | 0.09 | 0.03 | Lithium carbonate | 3.0 | 750 | 1.001 | 1.42 | 0.11 | 11.4 | ◎ | 209 | 111 |
| Example 7 | 1.03 | 0.88 | 0.09 | 0.03 | Lithium carbonate | 1.5 | 100 | 0.985 | 0.92 | 0.08 | 11.2 | ◎ | 206 | 117 |
| Example 8 | 1.03 | 0.88 | 0.09 | 0.03 | Lithium carbonate | 1.5 | 375 | 0.986 | 0.98 | 0.08 | 11.2 | ◎ | 207 | 115 |
| Example 9 | 1.03 | 0.88 | 0.09 | 0.03 | Lithium carbonate | 1.5 | 1500 | 0.995 | 1.35 | 0.17 | 11.4 | ◎ | 212 | 103 |
| Example 10 | 1.03 | 0.88 | 0.09 | 0.03 | Lithium carbonate | 1.5 | 3000 | 1.004 | 1.48 | 0.28 | 11.5 | ○ | 207 | 112 |
| Example 11 | 1.03 | 0.88 | 0.09 | 0.03 | Lithium citrate | 1.5 | 750 | 0.990 | 1.17 | 0.12 | 11.4 | ◎ | 210 | 105 |
| Example 12 | 1.03 | 0.88 | 0.09 | 0.03 | Lithium acetate | 1.5 | 750 | 0.991 | 1.05 | 0.11 | 11.3 | ◎ | 211 | 107 |
| Example 13 | 1.03 | 0.88 | 0.09 | 0.03 | Lithium nitrate | 1.5 | 750 | 0.991 | 1.01 | 0.11 | 11.3 | ◎ | 210 | 95 |
| Example 14 | 1.03 | 0.88 | 0.09 | 0.03 | Lithium sulfate | 1.5 | 750 | 0.990 | 1.03 | 0.10 | 11.3 | ◎ | 210 | 94 |
| Comparative Example 1 | 1.03 | 0.88 | 0.09 | 0.03 | — | — | — | — | 0.28 | 1.06 | 12.3 | X | 200 | 92 |
| Comparative Example 2 | 1.03 | 0.88 | 0.09 | 0.03 | (Pure water) | 0 | 750 | 0.976 | 0.55 | 0.11 | 11.3 | ◎ | 202 | 138 |
| Comparative Example 3 | 1.03 | 0.88 | 0.09 | 0.03 | (Pure water) | 0 | 1500 | 0.978 | 0.75 | 0.08 | 11.2 | ◎ | 203 | 172 |
| Comparative Example 4 | 1.03 | 0.88 | 0.09 | 0.03 | (Pure water) | 0 | 3000 | 1.012 | 2.01 | 0.51 | 11.8 | X | 197 | 95 |
| Comparative Example 5 | 1.03 | 0.88 | 0.09 | 0.03 | Lithium hydroxide | 1.5 | 750 | 1.065 | 4.69 | 0.78 | 12.0 | X | 201 | 93 |

Evaluation

The production conditions and evaluation results of the positive electrode active materials obtained in Examples and Comparative Examples are shown in Table 1.

As is obvious in Table 1, the lithium hydroxide contents of the positive electrode active materials obtained in Examples 1 to 14 were 0.5% by mass or less, and Li/(Ni+Co+M) in the powder surface thereof was 0.80 or more and 1.5 or less. These results reveal that these positive electrode active materials suppress the gelling of pastes obtained by kneading them, as well as have high discharge capacities and low positive electrode resistances and are useful as positive electrode active materials.

On the other hand, the lithium hydroxide content of the positive electrode active material obtained in Comparative Example 1 was as high as 1.06, and Li/(Ni+Co+M) in the powder surface thereof was as high as 6.28. The reason is that this positive electrode active material was not subjected to a cleaning step using an aqueous lithium salt solution. Also, a paste obtained by kneading this positive electrode active material was observed to be gelled. Further, this positive electrode active material had a low discharge capacity and showed lower battery performance than those of Examples.

In Comparative Examples 2 and 3, Li/(Ni+Co+M), which represents the composition ratio of the powder surface, was as low as 0.80 or less. The reason is that the positive electrode active materials thereof were cleaned with pure water. The resulting positive electrode active materials had low discharge capacities, as well as showed high positive electrode resistances and lower battery performance than those of Examples.

The lithium hydroxide content of the positive electrode active material obtained in Comparative Example 4 was as high as 0.51, and Li/(Ni+Co+M), which represents the composition ratio of the powder surface, was as high as 2.01. The reason is that this positive electrode active material was cleaned with pure water with the slurry concentration being 3000 g/L. Also, a paste obtained by kneading this positive electrode active material was observed to be gelled. Further, this positive electrode active material showed lower battery performance than those of Examples.

The lithium hydroxide content of the positive electrode active material obtained in Comparative Example 5 was as high as 0.78, and Li/(Ni+Co+M), which represents the composition ratio of the powder surface, was as high as 4.69. The reason is that this positive electrode active material was cleaned with the aqueous lithium hydroxide solution. Also, a paste obtained by kneading this positive electrode active material was observed to be gelled. Further, this positive electrode active material had a low discharge capacity and showed lower battery performance than those of Examples.

The above results reveal that if the positive electrode active materials obtained using the production method of the present embodiment are used as the positive electrode materials of secondary batteries, gelling of positive electrode mixture material pastes is able to be suppressed and the secondary batteries will have lower positive electrode resistances and thus high capacities and excellent output characteristics. These results also reveal that the positive electrode active materials of the present embodiment are useful as the positive electrode active materials of nonaqueous electrolyte secondary batteries.

INDUSTRIAL APPLICABILITY

Nonaqueous electrolyte secondary batteries having positive electrode active materials obtained according to the present invention in positive electrodes are able to be suitably used as the power supplies of small portable electronic devices (notebook personal computers, mobile phone terminals, etc.), which are always required to have high capacities, as well as are able to be suitably used as batteries for electric vehicles, which are required to produce high output.

Also, nonaqueous electrolyte secondary batteries according to the present invention have high safety and are able to be downsized and to produce high output and therefore are able to be suitably used as power supplies for electric vehicles, whose mounting space is limited. Also, nonaqueous electrolyte secondary batteries according to the present invention are able to be used not only as power supplies for electric vehicles, which are driven purely by electric energy, but also as power supplies for so-called "hybrid vehicles," which use also a combustion engine such as a gasoline engine or diesel engine.

The contents of Japanese Patent Application No. 2015-167530 and all documents cited in the above embodiment or the like are incorporated herein by reference as a part of the present description to the extent permitted by law.

DESCRIPTION OF REFERENCE SIGNS

BA . . . evaluation coin battery
1 . . . lithium metal negative electrode
2 . . . separator (impregnated with electrolyte solution)
3 . . . positive electrode (evaluation electrode)
4 . . . gasket
5 . . . negative electrode can
6 . . . positive electrode can
7 . . . current collector

The invention claimed is:

1. A method for producing a positive electrode active material for nonaqueous electrolyte secondary batteries, the method comprising:
cleaning a powder formed of a lithium-nickel composite oxide represented by a general formula $Li_zNi_{1-x-y}Co_xM_yO_2$ where $0 \le x \le 0.35$; $0 \le y \le 0.10$; $0.95 \le z \le 1.10$; and M is at least one element selected from Mn, V, Mg, Mo, Nb, Ti, and Al with an aqueous solution containing one or more lithium salts selected from water-soluble lithium salts other than lithium hydroxide; and
drying the cleaned powder,
wherein the cleaning reduces the atomic ratio of Li to the metals other than Li in the lithium-nickel composite oxide.

2. The method for producing a positive electrode active material for nonaqueous electrolyte secondary batteries of claim 1, wherein a lithium concentration of the aqueous solution is 0.1 g/L or more and 5.0 g/L or less.

3. The method for producing a positive electrode active material for nonaqueous electrolyte secondary batteries of claim 1, wherein the cleaning comprises cleaning the powder in a state in which a slurry concentration of the aqueous solution containing the powder is 100 g/L or more and 3000 g/L or less.

4. A positive electrode active material for nonaqueous electrolyte secondary batteries, comprising a powder of a lithium-nickel composite oxide represented by a general formula $Li_zNi_{1-x-y}Co_xM_yO_2$ where $0 \le x \le 0.35$; $0 \le y \le 0.10$; $0.95 \le z \le 1.10$; and M is at least one element selected from Mn, V, Mg, Mo, Nb, Ti, and Al, wherein
a lithium hydroxide content of the positive electrode active material is 0.5% by mass or less, and
a composition ratio between Li and metals other than Li in a surface of the powder measured by X-ray photoelectron spectroscopy is 0.80 or more and 1.5 or less, the composition ratio being Li/(Ni+Co+M), the metals being Ni, Co, and M.

5. The positive electrode active material for nonaqueous electrolyte secondary batteries of claim 4, wherein a powder pH of 5% by mass of a suspension solution obtained by dispersing the powder in water is 11.5 or less.

6. A nonaqueous electrolyte secondary battery having the positive electrode active material for nonaqueous electrolyte secondary batteries of claim 4 in a positive electrode.

7. The positive electrode active material for nonaqueous electrolyte secondary batteries of claim 4, wherein z satisfies $0.95 \le z \le 1.00$ in the general formula.

* * * * *